Patented Jan. 5, 1926.

1,568,622

UNITED STATES PATENT OFFICE.

EMIL REBER AND JAROSLAV FRÖHLICH, OF BASEL, SWITZERLAND, ASSIGNORS TO SOCIETY OF CHEMICAL INDUSTRY IN BASLE, OF BASEL, SWITZERLAND.

GREEN SULPHURIZED DYESTUFF AND PROCESS OF MAKING SAME.

No Drawing. Application filed July 9, 1923. Serial No. 650,480.

*To all whom it may concern:*

Be it known that we, EMIL REBER and JAROSLAV FRÖHLICH, both citizens of the Swiss Republic, and residing at Basel, Switzerland, have invented new and useful Green Sulphurized Dyestuffs and Processes of Making Same, of which the following is a full, clear, and exact specification.

It has been found that indophenols which are obtained from paraaminophenol and N-alkyl or aralkyl- α-naphthylamine, and having the general formula

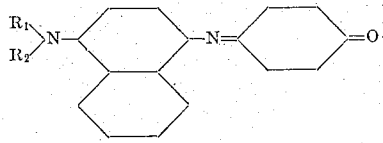

wherein $R_1$ may represent a hydrogen atom, an alkyl and an aralkyl radical, and $R_2$ an alkyl and aralkyl radical, may be converted into new sulfonated derivatives of 1-alkyl- or 1-aralkylamino-4-p'-oxyphenylnaphthyl-amines by treatment with salts of sulfurous acid. By heating these new sulfonated derivatives with alkali metal polysulfides in presence of copper, new sulfurized dyestuffs are obtained which are of good solubility, dyeing the vegetable fibre beautiful green tints which are distinguished by excellent fastness to boiling alkaline soap solutions.

The following example illustrates the invention, the parts being by weight.

Example.

27.6 parts of the indophenol obtained from paraaminophenol and ethyl-α-naphthyl-amine are suspended in 300 parts of water and stirred for some hours with 32.4 parts of sodium bisulfite solution of 40 per cent. strength, until all indophenol has been converted into a slightly greyish suspension. The reaction may be accelerated by gentle warming. The sulfonated derivative of 1-monoethylamino-4-p'-oxyphenylnaphthyl-amine thus obtained can be salted out almost completely. It can also be isolated by first rendering the reaction product alkaline by means of sodium carbonate, then heating and, if necessary, after filtration, by precipitating the sodium salt of the new acid by means of common salt.

The sulfonic acid of 1-monoethylamino-4-p'-oxyphenylnaphthylamine is a light grey powder and dissolves with some difficulty in cold water but somewhat more easily in hot water. Its sodium salt is soluble in cold water and freely soluble in hot water. Alkaline solutions of the new acid become bluish red when exposed to air.

19 parts of the sodium salt are introduced into a polysulfide solution prepared from 57 parts of crystallized sodium sulfide, 19.2 parts of sulfur and 4.5 parts of crystallized copper sulfate which has previously been evaporized until the boiling temperature of the mixture has reached 135–140° C. The whole is boiled for some time in a reflux apparatus until indophenol is no longer recognizable or until no further increase of dyestuff can be observed. The dyestuff is separated by acidifying or blowing air through its aqueous solution.

When dry it is a dark blue powder having a copper lustre. It dissolves in concentrated sulfuric acid to a blue solution and in dilute hot sodium sulfide to a greenish solution. It dyes the vegetable fibre directly and without after-treatment a pure green tint, the dyeing being fast to boiling alkaline soap solution.

The proportion of alkali metal polysulfide and the ratio of sulfur to sodium sulfide in the latter, and the temperature of the reaction may be varied within tolerably wide limits. Furthermore, the baking process can also be applied up to a temperature of 180–185° C. without damaging the color tone of the dyestuff.

The following table indicates the characteristic properties of other products made in accordance with the present invention.

| Alkyl-α-naph-thylamine | Color of sulfonated alkyl- or aralkyla-mino-4-p'-oxyphenyl-naphthyla-mine | Color of dyestuff | Color of solution with | | Shade obtd. on cotton |
|---|---|---|---|---|---|
| | | | Con-cen-trated $H_2SO_4$ | Dilute hot sodium sulfide | |
| Monomethyl-α-naphthyla-mine. | Grey pow-der. | Dark blue powder with coopper lustre. | Blue. | Green-i s h blue. | Green. |
| Monobenzyl-α-naphthyla-mine. | ---do------ | ---do------ | ---do--- | Bluish green. | Do. |
| Dimethyl-α-naphthyla-mine. | ---do------ | ---do------ | ---do--- | ---do----- | Do. |

What we claim is:

1. The herein described new process for the manufacture of new green sulfurized dyestuffs consisting in treating the indophenols of general formula

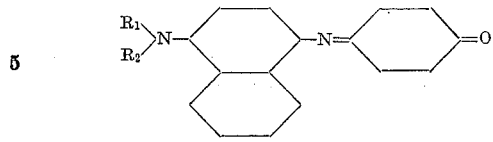

wherein $R_1$ may represent a hydogen atom, and alkyl and aralkyl radical, and $R_2$ an alkyl and aralkyl radical, with salts of sulfurous acid and then treating the sulfonated leuco-derivatives thus obtained with alkali metal polysulfides in the presence of copper.

2. The herein described new process for the manufacture of a new sulfurized dyestuff consisting in treating the indophenol of the formula

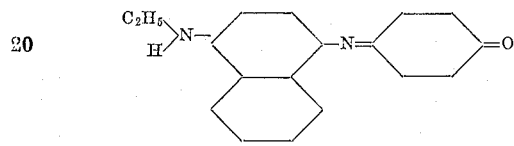

with a salt of sulfurous acid and then treating the sulfonated leuco-derivative thus obtained with alkali metal polysulfides in the presence of copper.

3. The herein described new green sulfurized dyestuffs resulting from the action of a salt of sulfurous acid on the indophenols of the general formula

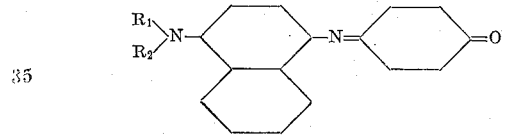

wherein $R_1$ may represent a hydrogen atom, an alkyl and aralkyl radical, and $R_2$ an alkyl and aralkyl radical, then treating the leuco-derivatives thus obtained with alkali metal polysulfides in the presence of copper, which dyestuffs constitute dark blue powders having a copper lustre, dissolving in concentrated sulfuric acid to a blue solution and freely dissolving in dilute hot sodium sulfide to solutions varying from greenish blue to bluish green, producing on the vegetable fibre beautiful green shades which are fast to boiling alkaline soap solutions.

4. As a new product the herein described new green sulfurized dyestuff resulting from the action of a salt of sulfurous acid on the indophenol of the formula

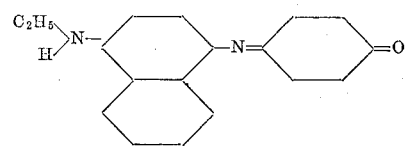

then treating the leuco-derivative thus obtained with alkali metal polysulfides in the presence of copper, which dyestuff constitutes a dark blue powder having a copper lustre, dissolving in concentrated sulfuric acid to a blue solution and freely dissolving in dilute hot sodium sulfide to solutions varying from greenish blue to bluish green, producing on the vegetable fibre beautiful green shades which are fast to boiling alkaline soap solutions.

In witness whereof we have hereunto signed our names this 28th day of June 1923.

EMIL REBER.
JAROSLAV FRÖHLICH.